(12) United States Patent
Ross et al.

(10) Patent No.: US 7,804,396 B2
(45) Date of Patent: Sep. 28, 2010

(54) TIRE PRESSURE MONITORING SYSTEM HAVING A COLLAPSIBLE CASING

(75) Inventors: Gregory E. Ross, Kailua Kona, HI (US); Terence S. Brozek, Royal Oak, MI (US); Arnold Mandel, Tuscon, AZ (US); Ivan-Pierre Batinic, San Martin, CA (US)

(73) Assignee: Advanced Tire Pressure Systems, Inc., Birmingham, MI (US)

( * ) Notice: Subject to any disclaimer, the term of this patent is extended or adjusted under 35 U.S.C. 154(b) by 288 days.

(21) Appl. No.: 12/135,441

(22) Filed: Jun. 9, 2008

(65) Prior Publication Data

US 2009/0079556 A1 Mar. 26, 2009

(51) Int. Cl.
*B60C 23/00* (2006.01)

(52) U.S. Cl. .............................. 340/443; 73/146; 116/34

(58) Field of Classification Search ............ 340/426.33, 340/686.1, 442, 451, 443; 73/146; 116/34 R
See application file for complete search history.

(56) References Cited

U.S. PATENT DOCUMENTS

| | | | |
|---|---|---|---|
| 3,521,230 | A | 7/1970 | Poole |
| 3,537,068 | A | 10/1970 | Amundsen, Jr. |
| 3,588,814 | A | 6/1971 | Furlong |
| 3,654,601 | A | 4/1972 | Munson et al. |
| 3,715,719 | A | 2/1973 | Sugiyama |
| 3,930,224 | A | 12/1975 | Whiteing et al. |
| 3,974,477 | A | 8/1976 | Hester |
| 3,977,355 | A | 8/1976 | Lorenz et al. |
| 3,978,448 | A | 8/1976 | Vago |
| 3,982,225 | A | 9/1976 | Schlanzky |
| 4,134,102 | A | 1/1979 | Stewart et al. |
| 4,137,520 | A | 1/1979 | Deveau |
| 4,159,465 | A | 6/1979 | Hatcher |
| 4,237,445 | A | 12/1980 | Crossman |
| 4,311,984 | A | 1/1982 | Rigazio et al. |

(Continued)

FOREIGN PATENT DOCUMENTS

DE 3208869 A1 9/1983

OTHER PUBLICATIONS

By Ryan Davis; entitled "GM, Others Targeted In Tire Pressure Patent Suit" reprinted from: IP Law 360, Portfolio Media, Inc., New York, NY, Mar. 25, 2008, www.law360.com.

(Continued)

*Primary Examiner*—Daniel Wu
*Assistant Examiner*—Frederick Ott
(74) *Attorney, Agent, or Firm*—Howard & Howard Attorneys PLLC

(57) ABSTRACT

A tire pressure monitoring device and system includes a support or housing mounted to a rim of a wheel of a vehicle. A casing is movably secured to the support and a pair of spaced magnets are disposed within the casing. The casing is collapsible for varying the length of the casing in response to changes in the tire pressure to move the magnets relative to each other. A sensor is mounted a distance from the casing for sensing a presence of each of the magnets. A controller is in communication with the sensor to determine the length of the casing and the relative movement between the magnets to calculate any changes in tire pressure.

20 Claims, 6 Drawing Sheets

U.S. PATENT DOCUMENTS

| | | | |
|---|---|---|---|
| 4,334,215 | A | 6/1982 | Frazier et al. |
| 4,337,718 | A | 7/1982 | Stewart et al. |
| 4,597,286 | A | 7/1986 | Aguglia |
| 4,807,468 | A * | 2/1989 | Galan ..................... 73/146.5 |
| 4,953,394 | A | 9/1990 | Franke et al. |
| 5,261,273 | A | 11/1993 | Imani et al. |
| 5,325,901 | A | 7/1994 | Olney et al. |
| 5,469,136 | A | 11/1995 | Matsubara et al. |
| 5,526,861 | A | 6/1996 | Oshita et al. |
| 5,537,867 | A | 7/1996 | Kosaka et al. |
| 5,542,293 | A | 8/1996 | Tsuda et al. |
| 5,553,491 | A | 9/1996 | Naito et al. |
| 5,717,135 | A | 2/1998 | Fiorletta et al. |
| 5,748,076 | A | 5/1998 | Horie |
| 5,825,285 | A | 10/1998 | Sawafuji |
| 5,856,619 | A | 1/1999 | Wang |
| 6,055,855 | A | 5/2000 | Straub |
| 6,612,165 | B2 | 9/2003 | Juzswik et al. |
| 6,662,665 | B1 * | 12/2003 | Huang ..................... 73/756 |
| 6,854,335 | B1 | 2/2005 | Burns |
| 6,973,824 | B2 | 12/2005 | Giustino et al. |
| 7,015,801 | B1 | 3/2006 | Juzswik |
| 7,030,743 | B2 | 4/2006 | Morris |
| 7,032,443 | B2 | 4/2006 | Moser |
| 7,194,901 | B2 | 3/2007 | Silverbrook et al. |
| 7,227,458 | B2 | 6/2007 | Watabe et al. |
| 7,289,930 | B2 | 10/2007 | Stolzl et al. |
| 7,312,698 | B2 | 12/2007 | Thiele |
| 2003/0061873 | A1 | 4/2003 | Lin |
| 2005/0072223 | A1 | 4/2005 | Fennel et al. |
| 2006/0049928 | A1 | 3/2006 | Ening |
| 2007/0277602 | A1 | 12/2007 | Heise et al. |

OTHER PUBLICATIONS

Article entitled "Yokohama Unveiling Tire Monitoring System" reprinted from: Copyrighted 2003 PRIMEDIA Business Magazines & Media Inc., dated Jun. 1, 2003, http://refrigeratedtrans.com/ar/transportation_yokohama_unveiling_tire/.

By Reuters: entitled "Regulators won't Appeal Tire Decision" reprinted from: Automotive News, dated Sep. 11, 2003, http://www.autonews.com/news.cms?newsld-6377.

Article entitled "Tire Pressure Monitoring" reprinted from: Continental Teves, Copyrighted Continental Teves AG & Co. oHG 2003, Legal, http://www.conti-online.com/generator/www/de/en/continentalteves/continentalteves/them....

Article entitled "Tire Pressure Monitoring System TPMS" reprinted from: Continental Teves, Copyrighted Continental Teves AG & Co. oHG 2003, Legal, http://www.conti-online.com/generator/www/de/en/continentalteves/ continentalteves/them....

Article entitled "1st Generation Tire Pressure Monitoring System Direct, 6-Wheel High Pressure System" reprinted from: SmarTire TM System, http://www.tirerack.com/accessories/smartire/smartire1.jsp, dated Nov. 6, 2003.

By US Department of Transportation, National Highway Traffic Safety Administration: entitled "An Evaluation of Existing Tire Pressure Monitoring Systems" dated Jul. 2001.

Article entitled "Tire Pressure Monitor System" Jeep Grand Cherokee WJ, reprinted from http://www.wjjeeps.com/tpms.htm, dated Aug. 21, 2006.

By George J. Soodoo, U.S. Dot/NHTSA: entitled "Tire Pressure Monitoring Systems NHTSA Final Rule", 51st GRRF, Geneva, Switerland, dated Feb. 4-8, 2002.

International Search Report PCT/US2009/003473, Sep. 11, 2009, 3 pages.

* cited by examiner

TIRE PRESSURE MONITORING SYSTEM HAVING A COLLAPSIBLE CASING

BACKGROUND OF THE INVENTION

1. Field of the Invention

A tire pressure monitoring system for a wheel of a vehicle.

2. Description of the Prior Art

Given recent developments, as well as national publicity, regarding vehicle rollover concerns and ways to prevent such rollovers from occurring, a market has developed for devices that enable drivers to monitor variables that have been shown to contribute to vehicle rollovers. In particular, a focus has centered on tire technology such as tread separation, which appears to have significantly contributed to vehicle rollovers. Tread separation in tires has been linked to insufficient tire pressure of the wheel. Thus, it appears that at least a portion of past vehicle rollover incidents could have been prevented by ensuring that the tire pressure remains within an acceptable pressure range.

Ensuring that proper tire pressure remains in the wheel can be a tedious task and is often overlooked. Although tire gauges are readily available, a driver must remember to periodically check the pressure in the wheels by taking a gauge and manually measuring the tire pressure in each of the wheels.

In order to provide some type of automatic monitoring, devices have been developed for continuously monitoring tire pressure in the wheels and displaying a warning if the tire pressure falls below an acceptable level. Many of the current devices utilize an instrument mounted on an exterior of a rim of the wheel or on an interior of the rim. These current devices, however, employ a battery source and transmit radio frequencies to a processor within the vehicle. Radio frequencies are subject to distortion and interference by external radio frequencies, power lines, etc. The distortion and interference may result in inaccurate readings from the devices. In addition, the devices require additional service for replacing the battery. Thus, there is an opportunity to provide an apparatus for continuously monitoring the tire pressure within the wheel, without employing radio frequencies or batteries, to provide accurate readings by overcoming the distortion and interference of the current technology.

SUMMARY OF THE INVENTION AND ADVANTAGES

A tire pressure monitoring system for a wheel rotatable about an axis. The wheel has an internal cavity with a tire pressure. The tire monitoring system includes a support or housing adapted for mounting within the internal cavity of the wheel with the support or housing being exposed to the tire pressure. A casing has a length and is movably disposed within the housing. A first magnet is secured to the casing at a first location. A second magnet is secured to the casing at a second location spaced from the first location. The casing is collapsible for varying the length of the casing in response to changes in the tire pressure to move the magnets relative to one another.

In a further aspect of the subject invention, the tire pressure monitoring system further includes a sensor mounted a distance from the casing for sensing a presence of each of the magnets. An additional aspect includes the casing being sealed at a predetermined pressure.

Accordingly, the subject invention addresses the concerns of the prior art by providing a tire pressure monitoring system that does not require a battery or power source within the internal cavity of the wheel. In addition, the subject invention allows for the continuous monitoring of the tire pressure of the wheel without the use of a transmitted radio frequency.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
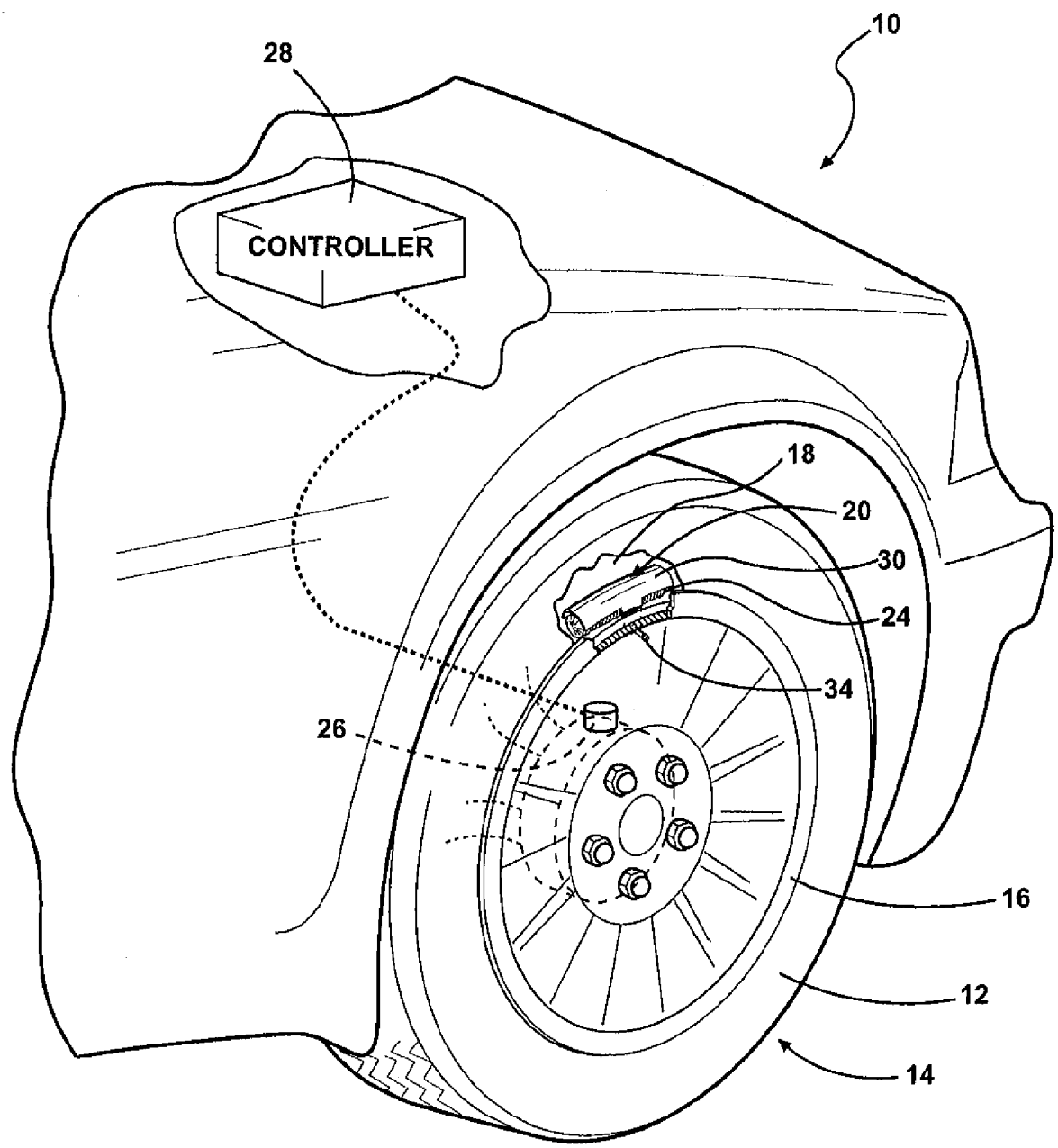
FIG. 1 is a perspective view of a tire pressure monitoring system in accordance with the subject invention.
Figure 2:
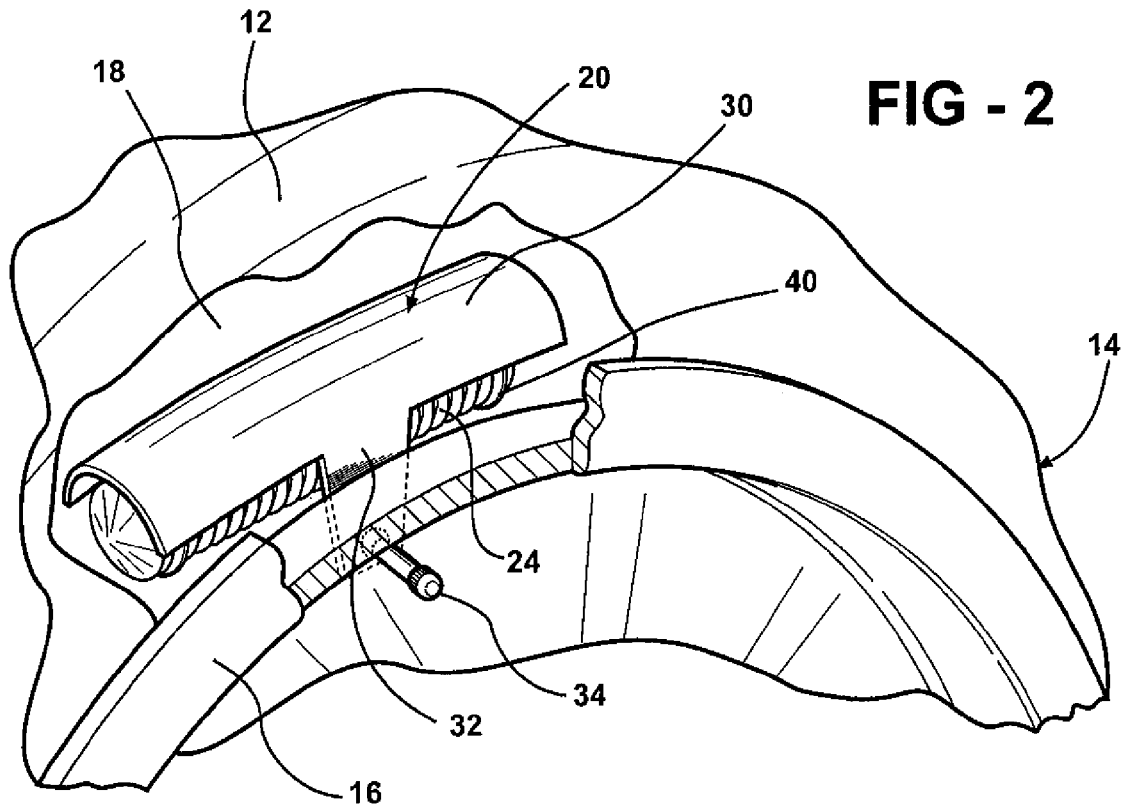
FIG. 2 is a fragmented perspective view of a wheel incorporating a tire pressure monitoring device of the tire pressure monitoring system.
Figure 5:
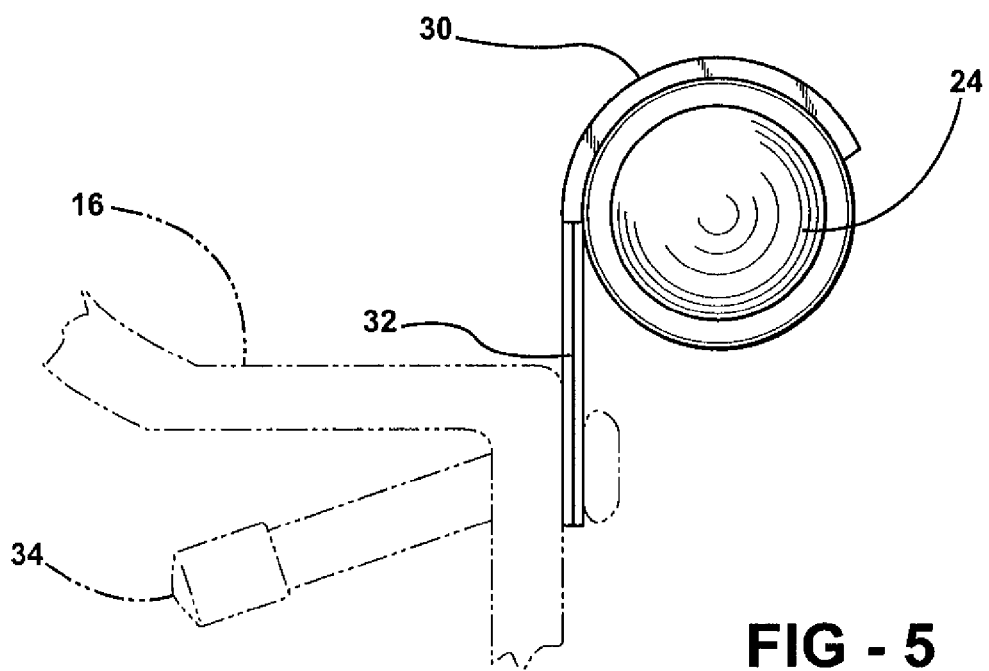
FIG. 5 is an end view of the tire pressure monitoring device.

Referring to the Figures, wherein like numerals indicate like or corresponding parts throughout the several views and embodiments, a tire pressure monitoring device and system for use in a vehicle is generally shown at 10 in FIG. 1.

The tire pressure monitoring device and system 10 determines a tire pressure within a wheel 14 that is rotatable about an axis. Specifically, the wheel 14 has a rim 16 and a tire 12 defining an internal cavity 18 with a tire pressure present within the cavity. The tire 12 is pressurized to the tire pressure as is commonly known in the art. The tire pressure is typically specified as a minimum and maximum tire pressure by the tire manufacturer, and/or the vehicle manufacturer, additionally the tire pressure may further vary dependent upon the loading of the vehicle.

The tire pressure monitoring system 10 includes a support or housing 20 adapted for mounting to the rim 16. The support or housing 20 is in fluid communication with the internal cavity 18 for exposing the support or housing 20 to the tire pressure within the internal cavity 18. In the preferred embodiment, the support or housing 20 is mounted to the rim 16 within the internal cavity 18. As discussed in greater detail below, the support or housing 20 can be mounted about a valve stem 34 or in any other suitable manner. The terms support and housing are meant to set forth any suitable structure for supporting or housing the components of the tire pressure monitoring device and will be used interchangeably throughout.

A sensor 26 is mounted to the vehicle at a distance from the tire pressure monitoring device 10. Typically, the sensor 26 is mounted adjacent the rim 16 and preferably mounted to a stationary structure of the vehicle, such as the brakes, that are disposed adjacent the rim 16. The sensor 26 is in communication with a controller 28 for determining the tire pressure. The sensor 26 may be of any suitable type or configuration as is known in the art. The tire pressure monitoring system 10 and the function of the components will be further discussed below.

Figure 3:
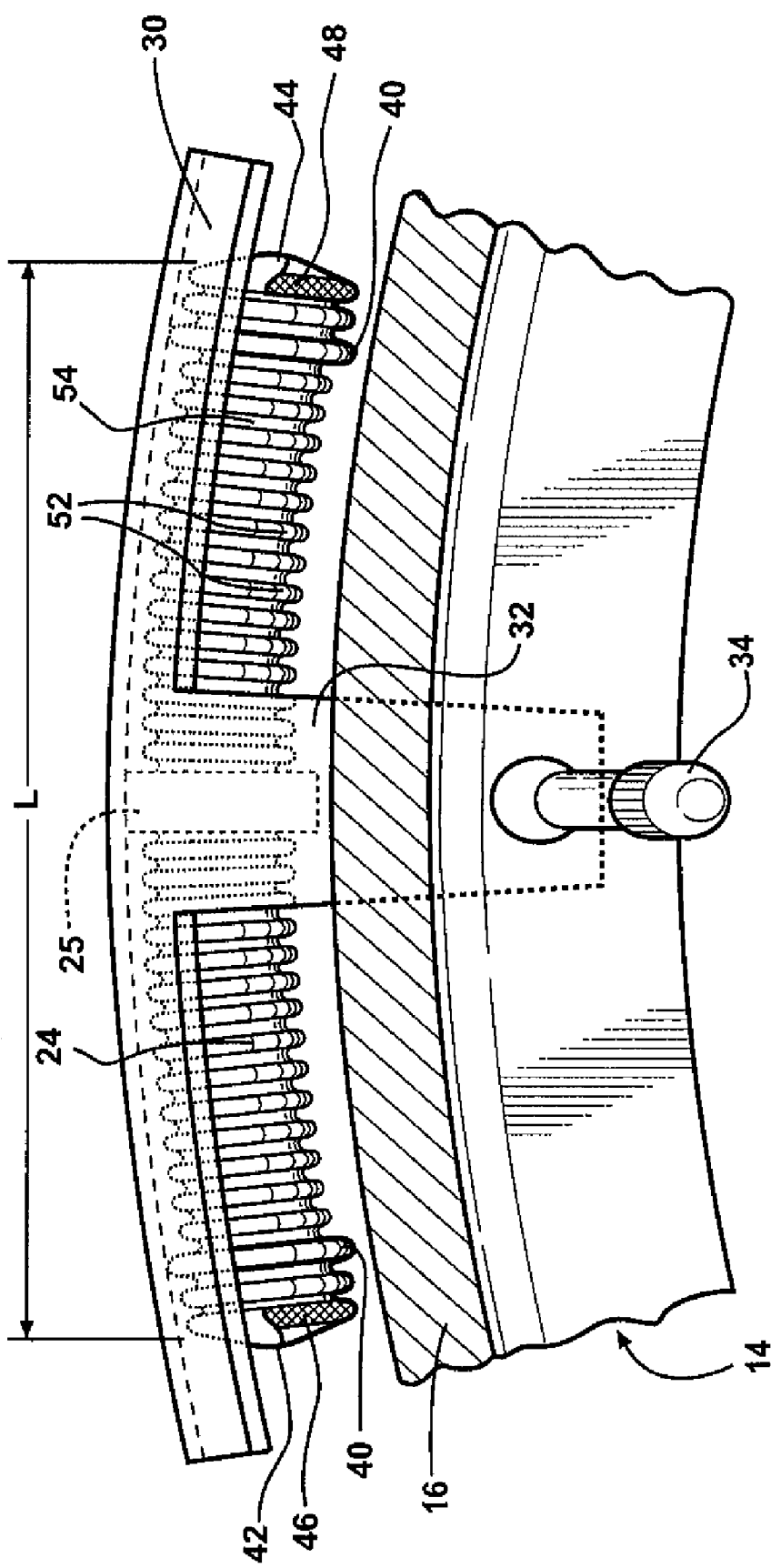
FIG. 3 is a fragmented partially cross-sectional side view of the tire pressure monitoring device.
Figure 4:
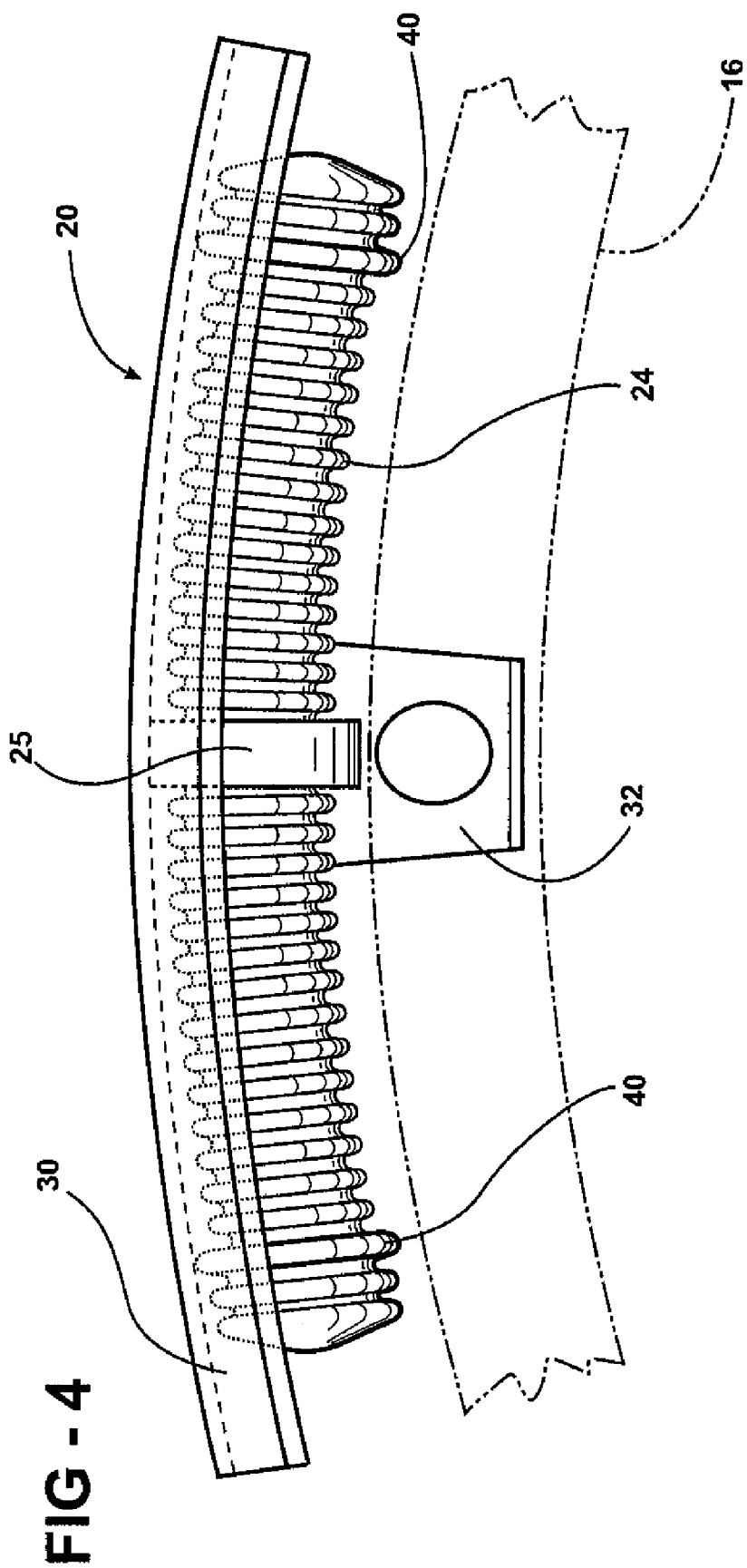
FIG. 4 is an opposing fragmented partially cross-sectional side view of the tire pressure monitoring device.

Referring also to FIGS. 2-5 the tire pressure monitoring device is shown in greater detail. A casing 24 is generally flexible, air-tight, and having a length. The casing 24 is supported by the support or housing 20 and the casing 24 is movably disposed for movement relative to the support or housing 20 in an arcuate path generally concentric with the rim 16 of the wheel 14. As shown in FIG. 4, the support or housing 20 includes a ring 25 or other suitable attachment device for simultaneously supporting the casing 24 and allowing movement of the casing 24 relative to the support or housing 20. The casing may be secured to the housing 20 at a single point, such as the ring 25, as shown in FIG. 4, or various other suitable attachment devices that do not impede the expansion and compression or the relative movement of the casing 24. The support or housing 20 further includes a cage 30 extending a length longer than the casing 24. The cage 30 has an arcuate configuration for guiding and constraining the casing 24 to the inside radius of the rim 16 while allowing for free lateral movement of the casing 24 relative to the support or housing 20. The support 20 further includes a tab portion 32 that is adapted to be mounted to the rim 16. The tab portion 32 preferably mounts the support 20 to a valve stem 34 passing through an opening on the tab portion 32. The tab portion 32 may be configured to accommodate the valve stem 34 at various angles in order to position the casing 24 along a circumscribed line or path generally concentric with the geometry of the rim 16 and retain the position of the support 20 relative to the rim 16 and wheel 14 while under the stresses incurred by centrifugal force resulting from the rotation of the wheel 14. It should be understood that the support 20 may be adhered or mounted to the rim 16 in various manners sufficient to withstand the forces exerted by the casing 24 against the support 20 during the rotation of the wheel 14. For example the support or housing 20 may be adhered to the rim 16 by a bonding material 38, i.e., adhesive, welding or various other methods such as clamping as is known in the art.

The tire pressure monitoring system 10 further includes at least one bearing 40 mounted to the casing 24. The bearing 40 engages the cage 30 for slidably supporting the casing 24 against the cage 30. The bearing 40 can be made from a variety of materials having anti-frictional characteristics, i.e. polytetrafluoroethylene or other plastic and metal materials. As shown in FIG. 3, the illustrated embodiment includes a pair of bearings 40 mounted to the casing 24 for slidably supporting the casing 24 to the support 20 as the length of the casing 24 varies in response to changes in the tire pressure, as will be further discussed below.

The casing 24 includes a first end 42 and a second end 44 spaced from the first end 42 to define a length L. A first magnet 46 is secured to the casing 24 at a first location. Preferably, the first magnet 46 is disposed within the casing 24 approximate the first end 42. A second magnet 48 is secured to the casing 24 at a second location. Preferably, the second magnet 48 is disposed within the casing 24 approximate the second end 44. The magnets 46, 48 may be secured to the casing 24 by various method and it is also to be understood that the magnets 46, 48 may be dispose inside the casing 24 or alternatively secured to the outside of the casing 24. As discussed in greater detail below, the magnets 46, 48 can move relative to each other and are designed to independently emit a magnetic field that can be sensed by the sensor 26. The position of the sensor 26 and the magnets 46, 48 allows for the sensor 26 to detect the presence of both magnets 46, 48 such that the magnetic fields do not intersect sufficiently to preclude the distinct detection of each magnet 46, 48.

The casing 24 is preferably sealed to a predetermined pressure. The predetermined pressure in a normal atmospheric environment typically extends the casing 24 to a near maximum length. The predetermined pressure within the casing 24 can vary for each application to provide a desired offset or detection range by the tire pressure monitoring system 10. Typically, the predetermined pressure within the casing 24 would be at barometric pressure at sea level. However, since it is desired for optimal operation of the tire pressure system 10 that the casing 24 is fully extended to a maximum length outside the internal cavity 18 of the wheel 14, depending on the casing 24 design, may require an elevated predetermined pressure greater than barometric pressure at sea level. More preferably, the predetermined pressure within the casing 24 and the geometry of the casing 24 can be optimized to operate through a range of tire pressures that is both above and below the optimum tire pressure for a particular wheel, establishing a detection range. As is commonly known in the industry, a typical optimum tire pressure for a passenger vehicle is 32 psi and a typical optimum tire pressure for a commercial truck is 80 psi. Currently, the industry requires that the driver be alerted to changes in tire pressure that are greater than 25% of the optimum tire pressure.

The operation of the tire pressure system 10 is independent of the predetermine pressure within the casing 24 and a correlation between the tire pressure and the relative distance between the magnets 46, 48, is utilized by the tire pressure monitoring system, as will be fully discussed below to determine the tire pressure. Therefore, the casing 24 will respond with some variation to the length or volume when exposed to a pressure different than barometric pressure at sea level. In addition, the predetermined pressure within the casing 24 may be increased to optimize the detection range of the tire pressure monitoring system 10. The predetermined pressure would be measured to a set pressure for example purposes elevated to 15 psi. Therefore, the casing 24 would collapse or move relative to the housing 20 when exposed to the tire pressure allowing for the detection range to be offset by the amount of the elevated predetermined pressure 15 psi in this example. It should be appreciated that the detection ranges of the tire pressure monitoring system 10 can be adjusted and designed to be any suitable detection range for a particular wheel 14. The predetermined pressure may be established within the casing 24 through the pressurization of any suitable gaseous composition, such as atmospheric air, a nitrogen-rich composition, nitrogen or any other gas or mixture of gas that provides a similar thermal expansion rate as the gas utilized to establish the tire pressure within the internal cavity 18.

Figure 6:
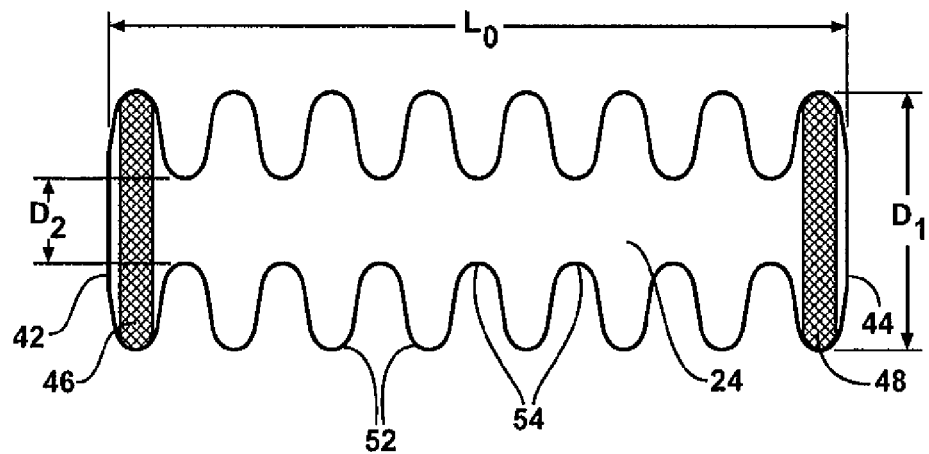
FIG. 6 is a cross-sectional side view of a casing at a nominal tire pressure.

The casing 24 has a bellow configuration defining a series of alternating crests 52 and valleys 54. The bellow configuration provides for a folding or collapsible direction of the casing 24 as the length varies in response to the variations in the tire pressure. The folding off the casing 24 changes the length and thereby the volume of the casing 24 to establish equilibrium between the tire pressure within the internal cavity 18 and the sealed casing 24. As best shown in FIG. 6, the crests 52 define a first diameter $D_1$ or a relative maximum diameter of the casing 24 at a given tire pressure. The valleys 54 define a second diameter $D_2$ of a relative minimum diameter of the casing 24 at a given tire pressure. The bellow configuration is structured to resist collapsing of the casing 24 in a direction transverse to the length L between the first and second ends 42, 44 or the first and second magnets 46, 48. The first diameter $D_1$ and the second diameter $D_2$ may change as the bellow configuration folds or extends to the changes in the length of the casing 24 due to variation in the tire pressure. The casing 24 is further structured to withstand the predetermined pressure as discussed above and the casing 24 geometry design determines the detection range and may be optimized for each application.

Figure 7:
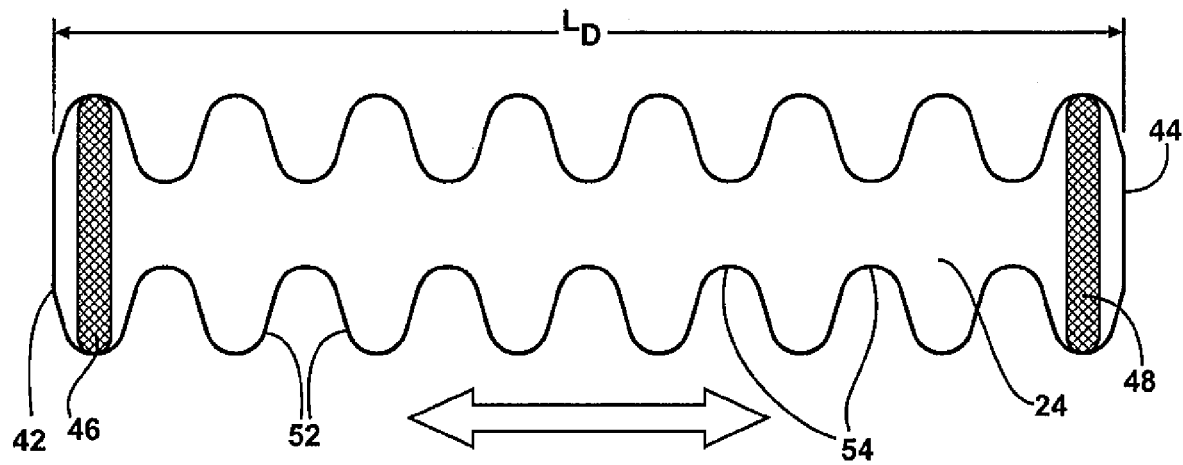
FIG. 7 is a cross-sectional side view of the casing at a decreased tire pressure.
Figure 8:
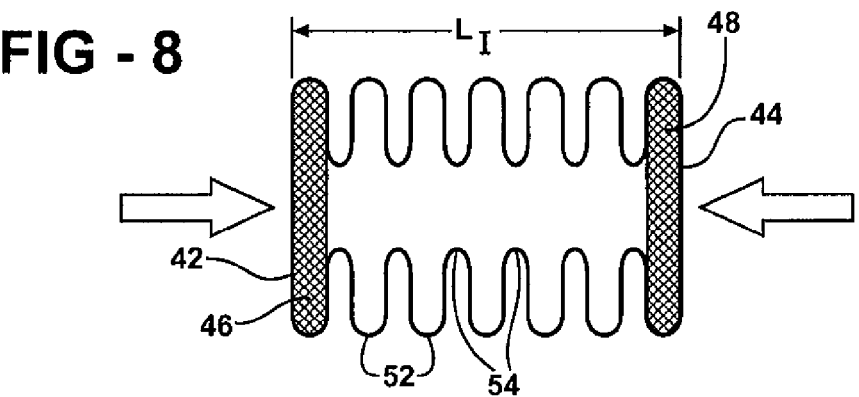
FIG. 8 is a cross-sectional side view of the casing at an increased tire pressure.

Specifically referring to FIG. 6, the casing 24 is in a state of a nominal tire pressure and the casing 24 responds in length to the tire pressure and establishes a nominal length $L_O$ of the casing 24. The sealed casing 24 reacts to any variation of the tire pressure. Referring to FIG. 7, the casing 24 is exposed to a decreased tire pressure. The casing 24 therefore extends to a decrease tire pressure length $L_D$ between the first and second ends 42, 44 of the casing 24. Referring to FIG. 8, the casing 24 is exposed to an increased tire pressure. The casing 24 therefore collapses to an increased tire pressure length $L_I$ between the first and second ends 42, 44 of the casing 24. The bellow configuration allows the length of the casing 24 to change by either collapsing or extending between the first and second ends 42, 44. The change in the length $L_O$, $L_I$, $L_D$ thereby moves the magnets 46, 48 secured to the casing 24 in response to changes or variations in the tire pressure. Additionally, the length of the casing 24 may vary to provide optimized resolution or accuracy of measuring the tire pressure within the wheel 14.

The sensor 26 detects the presence of the first and second magnets 46, 48 with each rotation of the wheel 14. The controller 28 determines the length of the casing 24 from the detection by the sensor 26 of the presence of the first and second magnets 46, 48. The controller 28 calculates changes in the tire pressure based on the varying length $L_O$, $L_I$, $L_D$ of the casing 24 by the relative movement of the magnets 46, 48 in response to changes in the tire pressure within the internal cavity 18 of the wheel 14. The controller 28 in communication with the sensor 26 establishes which of the magnets 46, 48 is being detected by the sensor 26, in order to synchronize the algorithm within the controller 28 to each wheel 14 and corresponding housing 20 and casing 24 within the internal cavity 18 of the wheel 14. The controller 28 via several full rotations of the wheel 14, a maximum of 3, can determine and establish the presence of both magnets 46, 48 as each magnet 46, 48 pass by and the presence is detected by the sensor 26. The reference point or position of the magnets 46, 48 relative to each other is preferably determined automatically by the controller 28 as the wheel 14 rotates and a predetermined reference point for the position of the magnets 46, 48 relative to each other is not required. The controller 28 utilizes the detection of the magnets 46, 48 and an algorithm to determine a ratio of the length $L_O$, $L_I$, $L_D$ of the casing 24 to a circumference of the rim 16. The ratio and the relationship between the length of the casing 24 at various tire pressures to the circumference of the rim 16 is utilized by the controller to determine the tire pressure within the internal cavity 18 of the wheel 14.

Figure 9:
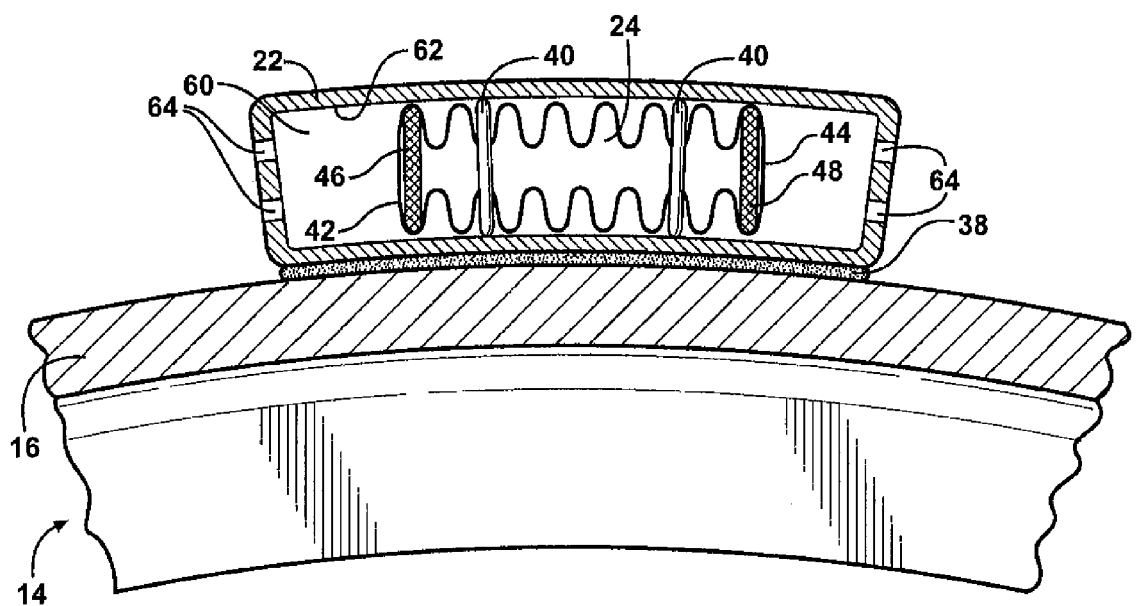
FIG. 9 is a fragmented partially cross-sectional side view of a first alternative embodiment of the tire pressure monitoring system.

Referring to FIG. 9, a first alternative embodiment of the tire pressure monitoring system 10 is shown. The tire pressure monitoring system 10 of this embodiment includes a similar first magnet 46 secured to a casing 24 at a first location and a similar second magnet 48 secured to the casing 24 at a second location, spaced from the first location. The first alternative embodiment further includes the casing 24 having a bellow configuration 50, similar to that previously discussed embodiment, having an alternating series of crests 52 and valleys 54. At least one bearing 40 is mounted to the casing 24 and engages a support or housing 22 for slidably supporting the casing 24 within the housing 22.

The primary difference shown in the first alternative embodiment of FIG. 9 relates to the configuration of the support or housing 22. The support or housing 22 has a generally cylindrical shape and is analogous to the support or housing 20 in the embodiment discussed above. The housing 22 has an internal wall 62 defining a chamber 60 for supporting the casing 24 and securing the casing 24 in the internal cavity 18 of the wheel 14. The housing 22 is arcuate and generally concentric with the wheel 14 or rim 16. The housing 22 further defines apertures 64 for allowing the chamber 60 to be in fluid communication with the internal cavity 18 of the wheel 14. The casing 24 is fully floating within the support or the housing 22, provided the housing 22 contains the casing 24 loosely against the curvature of the rim 16 and prevents the casing 24 from exiting the housing 22. The casing 24 may slide lengthwise within the housing 22 without effecting the operation as is fully discussed above.

The housing 22 may be formed of various non-magnetic materials such as a plastic or various non-magnetic metals such as aluminum to allow the casing 24 to freely vary in length in response to changes in the tire pressure to move the magnets 46, 48, as previously discussed above. The housing 22 may further provide isolation of the magnets 46, 48 from the wheel 14.

The housing 22 may be attached to the wheel 14 or mounted within the internal cavity 18 of the wheel 14 by various methods. As shown in FIG. 9, the housing 22 is mounted to the wheel 14 by a bonding material 38. The bonding material 38 may be an adhesive for gluing or securing the housing 22 to the wheel 14.

Figure 10:
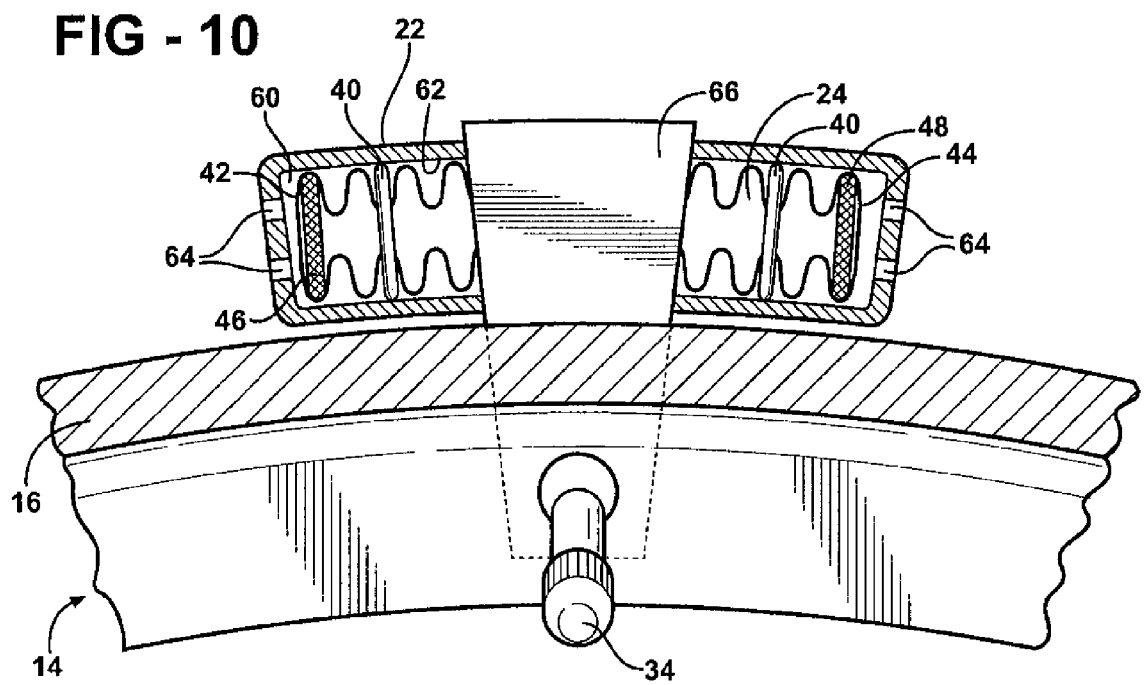
FIG. 10 is a fragmented partially cross-sectional side view of a second alternative embodiment of the tire pressure monitoring system.

Referring to FIG. 10, a second alternative embodiment of the tire pressure monitoring system 10 is shown. In this embodiment, the housing 22 is similar in structure and material as already described in the first alternative embodiment. The housing 22 of the second alternative embodiment further includes a tab 66. The tab 66 is similar to the tab portion 32 of the illustrated embodiment and allows the housing 22 to be mounted within the internal cavity 18 of the wheel 14 by the valve stem 34.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, the invention may be practiced otherwise than as specifically described.

What is claimed is:

1. A tire pressure monitoring system for a wheel having a rim and a tire defining an internal cavity with a tire pressure present within the cavity, said system comprising:

a support adapted for mounting to the rim within the internal cavity;

a casing supported by said support and having a first end and a second end spaced from said first end with said ends defining a length;

a first magnet disposed within said casing approximate said first end;

a second magnet disposed within said casing approximate said second end; and a sensor mounted a distance from said casing for sensing a presence of each of said magnets;

said casing being sealed at a predetermined pressure and collapsible for varying said length of said casing in response to changes in the tire pressure within the internal cavity of the wheel to move said first magnet relative to said second magnet.

2. The tire pressure monitoring system as set forth in claim 1 wherein said support further includes a cage extending a distance greater than said length of said casing with said cage having an arcuate configuration for guiding said casing as said length varies in response to changes in the tire pressure.

3. The tire pressure monitoring system as set forth in claim 2 further including at least one bearing mounted to said casing and engaging said cage for slidably supporting said casing against said cage as said length of said casing varies in response to changes in the tire pressure.

4. The tire pressure monitoring system as set forth in claim 1 further including a controller in communication with said sensor and having an algorithm for determining said length and said relative movement between said magnets to calculate changes in the tire pressure.

5. The tire pressure monitoring system as set forth in claim 1 wherein said casing is sealed with one of a nitrogen-rich mixture and nitrogen at said predetermined pressure.

6. The tire pressure monitoring system as set forth in claim 1 wherein said casing has a bellow configuration defining a series of alternating crests and valleys for providing a collapsible direction for varying said length of said casing in response to changes in the tire pressure.

7. The tire pressure monitoring system as set forth in claim 6 wherein said crests define a first diameter of said casing and said valleys define a second diameter of said casing smaller than said first diameter.

8. A tire pressure monitoring device for a wheel having a rim and a tire defining an internal cavity with a tire pressure present within the cavity, said device comprising:

a housing adapted for mounting to the rim and in fluid communication with the internal cavity for exposing said housing to the tire pressure;

a casing having a length and movably disposed relative to said housing;

a first magnet secured to said casing at a first location; and a second magnet secured to said casing at a second location spaced from said first location;

said casing being collapsible for varying said length of said casing in response to changes in the tire pressure to move said magnets relative to one another.

9. The tire pressure monitoring device as set forth in claim 8 wherein said casing has a bellow configuration defining a series of alternating crests and valleys for providing a collapsible direction for varying said length of said casing in response to changes in the tire pressure.

10. The tire pressure monitoring device as set forth in claim 9 wherein said crests define a first diameter of said casing and said valleys define a second diameter of said casing smaller than said first diameter.

11. The tire pressure monitoring device as set forth in claim 8 further including at least one bearing mounted to said casing and engaging said housing for slidably supporting said casing relative to said housing and for allowing said length of said casing to freely slide in response to changes in the tire pressure.

12. The tire pressure monitoring device as set forth in claim 8 wherein said housing has an internal wall of a generally cylindrical shape defining a chamber surrounding said casing.

13. The tire pressure monitoring device as set forth in claim 12 wherein said housing has an arcuate configuration for guiding said casing as said length varies in response to changes in the tire pressure.

14. The tire pressure monitoring device as set forth in claim 8 wherein said housing defines an aperture for providing said fluid communication between said chamber and the internal cavity.

15. The tire pressure monitoring device as set forth in claim 8 wherein said housing is formed of a non-magnet material for isolating said casing and said first and second magnets.

16. The tire pressure monitoring device as set forth in claim 8 wherein said housing includes a tab extending therefrom for securing said housing to the rim.

17. The tire pressure monitoring device as set forth in claim 8 wherein said housing includes an attachment device for simultaneously supporting said casing and allowing movement of said casing relative to said housing.

18. The tire pressure monitoring device as set forth in claim 8 further including a bonding material for mounting said housing to the rim.

19. The tire monitoring device as set forth in claim 8 wherein said casing is sealed at a predetermined pressure.

20. The tire pressure monitoring device as set forth in claim 19 wherein said casing is sealed with one of a nitrogen-rich mixture and nitrogen at said predetermined pressure.

* * * * *